(12) United States Patent
Hrasko

(10) Patent No.: US 10,810,190 B2
(45) Date of Patent: Oct. 20, 2020

(54) DATABASE BLOCKING DETECTION

(71) Applicant: SAP SE, Walldorf (DE)

(72) Inventor: Pavol Hrasko, Bratislava (SK)

(73) Assignee: SAP SE, Walldorf (DE)

( * ) Notice: Subject to any disclaimer, the term of this patent is extended or adjusted under 35 U.S.C. 154(b) by 378 days.

(21) Appl. No.: 15/849,666

(22) Filed: Dec. 21, 2017

(65) Prior Publication Data

US 2019/0197151 A1   Jun. 27, 2019

(51) Int. Cl.
*G06F 16/24* (2019.01)
*G06F 11/30* (2006.01)
*G06F 16/21* (2019.01)

(52) U.S. Cl.
CPC .......... *G06F 16/24* (2019.01); *G06F 11/3089* (2013.01); *G06F 16/21* (2019.01); *G06F 2201/80* (2013.01)

(58) Field of Classification Search
CPC ...... G06F 11/3006; G06F 16/24; G06F 16/21; G06F 11/3089; G06F 2201/80
See application file for complete search history.

(56) References Cited

U.S. PATENT DOCUMENTS

| 8,606,817 | B2* | 12/2013 | Metzger | G06F 16/21 |
| | | | | 707/783 |
| 2014/0075248 | A1* | 3/2014 | Sevilmis | G06F 11/0715 |
| | | | | 714/45 |

OTHER PUBLICATIONS

Perham, Timeout: Ruby's Most Dangerous API May 8, 2015, mikeperham.com, https://www.mikeperham.com/2015/05/08/timeout-rubys-most-dangerous-api/.*

* cited by examiner

Primary Examiner — Jason G Liao
(74) Attorney, Agent, or Firm — Buckley, Maschoff & Talwalkar LLC

(57) ABSTRACT

Various embodiments of systems and methods for detecting database blocking are described herein. The method includes detecting a non-responding state of an application. Once the non-responding state is detected, a request is sent to a database to retrieve blocking information related to the application. The blocking information is received from the database. The blocking information indicates whether the non-responding state of the application is due to database blocking or other issues. When the non-responding state is detected due to the database blocking, the blocking information also indicates whether the application is a victim or the application is a root blocker. When the application is the victim, one or more IDs and contact information related to the root blocker is provided to resolve database blocking, e.g., by discussion. When the application is the root blocker, IDs and contact information related to one or more victims of the application is provided.

13 Claims, 7 Drawing Sheets

DATABASE BLOCKING DETECTION

BACKGROUND

A database stores data or information which may be used by multiple clients (e.g., users, organizations, devices, etc.). The database includes various information resources such as tables, objects, etc., which may be accessed, used, and/or edited by the clients. In a multiuser environment, multiple clients may connect to the database and make changes to the database resources. Different clients have different access permission to the database resources. Access permission defines an extent of change that can be done to database resources. For example, a user A may have 'read' permission for a database table whereas a user B may have 'read-write' permission for the same database table. In a multiuser environment, various clients can edit a database resource (e.g., shared data) based upon their access permission which may cause data inconsistency or conflicting edits/changes. It is necessary to avoid or resolve such conflicts or data inconsistency.

Usually, in a multiuser environment, when a client works on a database resource (e.g., makes changes, edits, etc.), the database resource may be locked so that other clients cannot use or change it. For example, when a user accesses a database table. e.g., using operations or structured query language (SQL) command such as 'INSERT', 'SELECT', 'UPDATE', and 'DELETE', etc., the database table may be locked and made unavailable to other users. Locking is done for synchronization to ensure data consistency of shared data and to avoid inconsistent or conflicting changes/edits in the multiuser environment.

However, when a database resource is locked by a user, other users or clients may not be able to access the locked resource and the database response gets delayed. Specifically, the database response or operations related to the locked resource is delayed and the clients waiting for the locked resource are blocked. There might be multiple such queued or blocked clients which makes database processing inefficient. Further, if a blocked client has already started database transaction or operation and has locked some other resources or data which might be needed by other clients, then those other clients also get blocked and a chain or tree of waiting or blocked clients is created which further affects the database processing efficiency. Moreover, it is difficult to accurately identify or determine that the delayed database response is due to database blocking or locked resources. Furthermore, the client who is responsible for creating the blocking chain/tree (i.e., root blocker) might be unaware of the blocking issue. In fact, usually, the clients assume that the delay may be due to some network issues (e g., slow network) or due to some application design issues (poor design of their application which is trying to access the database resources). Also, contacting a professional to determine a real cause of the delay may be an arduous, time consuming, and costly task.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Figure 1:
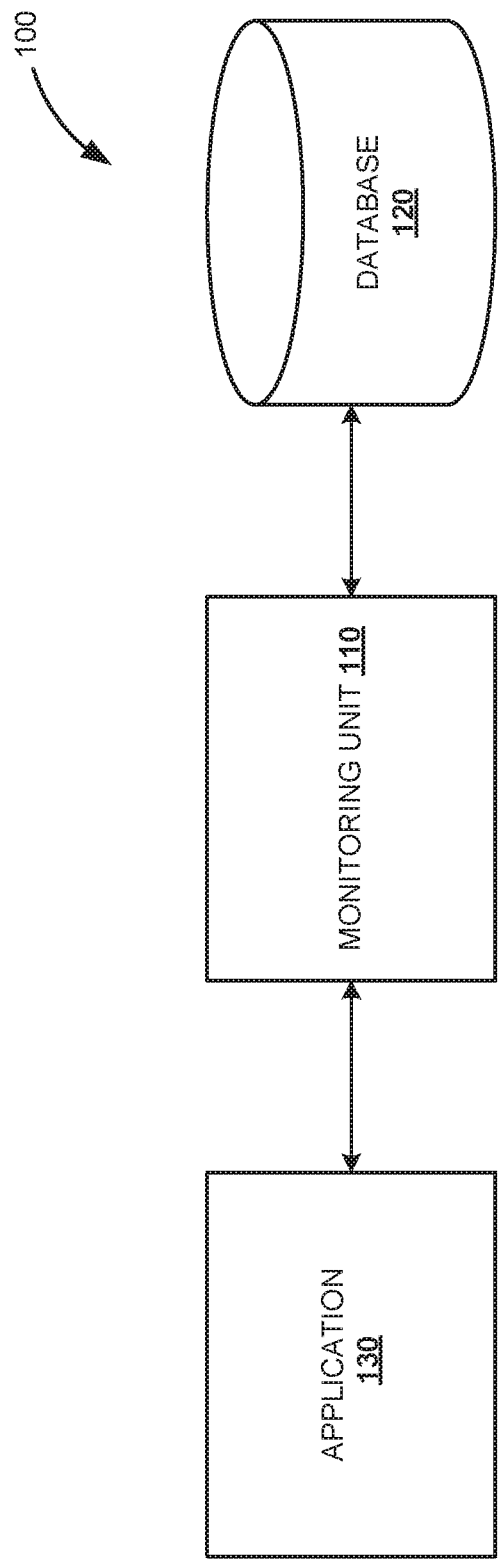
FIG. 1 is a block diagram illustrating exemplary database blocking detection environment including monitoring unit to automatically detect database blocking, according to an embodiment.

Embodiments of techniques for database blocking detection are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Object" refers to a software model (including logic and data) representing real-world or virtual entities. For example, an object may represent an address, an associate partner, a user, etc. An object may have one or more properties or attributes, e.g., the object "address" may include attributes such as building name, street number, lane number, pin code, country, etc. Typically, an object comprises logic and/or data. The data refers to values of various attributes of the object. For example, for the object "address" the data may be values of attributes building name, street number, lane number, pin code, country, etc.

"Application" refers to a program coded for specific purpose or use. For example, an application may refer to a program coded for tracking manufacturing process, maintaining user's information or record, etc. The application may need data or information from another application(s), table(s), object(s), etc. The information or data may be stored or maintained in a database. Therefore, the application may contact or access the database to request or retrieve the required information or data. An application may comprise of multiple processes or threads. For example, an application for jewelry manufacturing may comprise of multiple processes or threads including e.g., design making process, molding process, casting process, filing process, and polishing process, etc.

"Thread" refers to a process which performs a specific function within the application. For example, each process or thread within the jewelry manufacturing application may perform a specific function such as: (i) design making process which helps to create jewelry design, (ii) molding process which helps to covert the jewelry design into mold, (iii) casting process which helps to create jewelry in metal casting form using a wax replica of the jewelry, (iv) filing process which helps to remove access metal from the caste and even-out the jewelry surface, and (v) polishing process which helps to polish the jewelry. The processes or threads may be interlinked, e.g., an output generated by one process may be used (e.g., as input) by other process within the application. For example, the output generated by the design making process (i.e., jewelry design) may be used as an input to the molding process. A process or thread, within the application, may request data or information from the database. For example, the molding process may access the database to retrieve the jewelry design (output) generated by the design making process and stored in the database.

"Client" refers to a user or device which may contact database for data or information. A client makes connection with the database through unique connection identifier (ID). The connection ID may include client's information such as client ID, host or device ID, client name, etc. In an embodiment, the client may also refer to any client's application, process, module, etc., which requests information from the database. If the client's application requests information from the database, then the connection ID may also include a name or ID of the application. Similarly, if a process or thread (within the client's application) requests information from the database, then the connection ID may also include the thread or process ID (PID), etc. Once the client establishes the connection with the database (e.g., using the connection ID), the client may read or edit the database resources including data, objects, tables, etc. Different client may have different access permission (access rights) to the database. The access permission defines an extent of the change that can be done with the database. For example, a user A may have read permission for the database table whereas a user B may have read-write permission for the same database table.

"Database resource" refers to various tables, objects, information models, shared data, etc., within the database, which contain information or data that may be used by the clients. In a multiuser environment, different clients may have different access permission (access rights) to the database resources. For example, some clients may have read-write access to the database resources while other clients may have just read access to the same database resources. In an embodiment, a client may have read-write access to some database resources while the same client may have just read access to other database resources.

"Locked resources" refers to those database resources which are locked by a client and cannot be accessed or used by other clients. For example, when a user (client) access the database table. e.g., using operations or SQL command such as INSERT, SELECT, UPDATE, and DELETE, etc., the database table may be locked and made unavailable to the other clients/users. There may be several types of data locks for the database resources. The data lock for the database resources, includes, but is not limited to, a shared lock and an exclusive lock. In the exclusive lock, if a client locks a database resource, the other clients cannot access, view, and/or even read the data of the locked resource. In the shared mode, if a client locks a database resource, the other clients may not be able to edit or change the data, but, can view or read the data of the locked resource.

"Blocked application" refers to a client application, thread, process, module, etc., which is awaiting information from a locked resource of the database. In an aspect, if a waiting period of the application (client) is more than a predefined time period, the application may be marked as blocked. In various embodiments, the blocked application may be referred as "victim." The blocked application might also have locked data or resource needed by other application(s) and blocks other application(s). Typically, there might be other applications which get blocked as they await or need response from the already blocked application. A group of such waiting or blocked applications may form a chain or a tree structure and may be referred as "blocking chain" and "blocking tree", respectively. An application at the top of the blocking tree or chain is a root cause of the delay (database blocking) and may be referred as "root blocker."

Embodiments provide an efficient way to detect database blocking. The time, effort, professionals, and money required to identify the database blocking is saved. Users themselves can easily, quickly, and accurately identify the database blocking (i.e., identify whether the delay is due to locked resources at the database). Further, the user can also get the information about an application and a host (e.g., device) which has locked the database resources and caused database blocking. The user may contact the host (other participating user) to resolve the issue and avoid blocking issue at the database (e.g., by discussion). Moreover, the information is provided to the user if the user is the one locking the database resources (blocking database) for other participating clients (users) so that the user can act accordingly. Also, the user is provided information of other clients participating in the blocking tree so that the user may take action (e.g., through discussion) to resolve the database blocking. Therefore, the database blocking can be easily and efficiently identified and handled (avoided) which makes the database processing or transaction more efficient.

FIG. 1 is a block diagram illustrating exemplary database blocking detection environment 100 including monitoring unit 110 to automatically detect database 120 blocking, according to an embodiment. The database 120 may include various data and/or information which may be used by various clients (e.g., users, devices, applications, processes, modules, etc.). The data or information may be included within database resources (e.g., objects, information models, tables, etc.) of the database 120. The data may be retrieved or accessed from the database 120 by one or more clients, e.g., application 130. The application 130 may have a unique connection identifier (ID) to establish connection with the database 120. In an embodiment, the application 130 may send requests (e.g., using SQL command SELECT. EDIT, etc.) to the database 120 to retrieve data from the database 120 or edit data within the database 120. Based upon the request, the database 120 returns the data or edits the data. It may be required to monitor the connectivity between the application 130 and the database 120 for efficient execution of the requests/command. The monitoring unit 110 monitors the connectivity of the application 130 with the database 120, e.g., by detecting whether the application 130 is in "responding state" (e.g., communicating with the database, sending requests to the database, and receiving the response from the database 120). In an aspect, the monitoring unit 110 detects the state (e.g., responding or non-responding state) of the application 130. The state (responding/non-responding) of the application 130 may be detected from a device where the application 130 is installed and/or executed. For example, from a Windows® task manager (which maintains state/status of executing applications/processes) of the device. When the application 130 is detected in the "non-responding" state, the monitoring unit 110 may retrieve blocking information (to identify the cause for "non-responding" state of the application) from the database 120. In an embodiment, the monitoring unit 110 sends a request to the database 120 including application 130 ID, name, etc., to retrieve the blocking information of the application 130 from the database 120. In an embodiment, the request may include code (e.g., SQL script) to be executed to retrieve the blocking information from the database 120. In an embodiment, the blocking information may indicate whether the "non-responding" state of the application is due to database blocking or other reason(s). In an embodiment, when the "non-responding" state of the application is due to database blocking, the blocking information includes details about a host (device), application, and process, etc., which has caused database blocking and blocked the application 130 (e.g., by locking one or more database data or resources required by the application 130). In an embodiment, the blocking information also indicates if the application 130 is a blocking application (e.g., root blocker) which has blocked other applications and caused database blocking.

An application (e.g., the application 130) may be generated for performing a specific task. The application 130 may have a unique identifier (ID) or name. The application 130 may include one or more threads or processes. For example, if an application is created for maintaining user's information, it may include a process for collecting user's personal information and a process for collecting user's professional information. Similarly, an application for jewelry manufacturing may comprise multiple processes or threads which are interlinked (e.g., design making process, molding process, casting process, filing process, and polishing process, etc.). Each process or thread performs a specific function within the application. A thread or process may also have a unique ID referred as "process ID" or PID to identify the process/thread within the application. In an embodiment, if an application includes a single process/thread, that process or thread may be identified by the name or ID of the application itself. The application or the one or more processes or threads within the application may require some information or data stored on the database (e.g., the database 120). The application or the one or more processes of the application may send a request to the database to access information. The request may be sent using SQL commands such as SELECT, READ, RETRIEVE, etc. The interaction of the application with the database may be monitored, e.g., through a monitoring unit (e.g., the monitoring unit 110).

The monitoring unit 110 may be a part of the application (e.g., the application 130) or may be a separate application installed on at least one of a user's or client's device or a database (e.g., the database 120). In an embodiment, the monitoring unit 110 may be on a cloud/server. The monitoring unit 110 monitors the state (e.g., responding or non-responding state) of the application 130. The monitoring unit 110 may communicate with the application 130 or the device (e.g., where the application 130 is installed or executed) to detect the state of the application 130. For example, the monitoring unit 110 may communicate with the device (e.g., its Windows® API or task manager) to detect or determine the state of the application 130 executing on it. The Windows® API or task manager shows the state/status of the applications and/or the processes executing on the device. In an embodiment, when the monitoring unit 110 is a part of the device (client's device), it may get activated automatically when the device boots and starts checking the application 130 state (e.g., through Windows® API or task manager). In an embodiment, when the monitoring unit 110 is a part of the application 130 (being monitored), a main thread of the application 130 may send some predefined message to the monitoring unit 110 at a predefined time interval (e.g., every 5 seconds). If the monitoring unit 110 stops receiving the predefined message from the main thread at a predefined time interval, the monitoring unit 110 may determine that the main thread is freezed and the application 130 is in non-responding state. In an embodiment, a message or command may be sent to the application at regular time interval and if the application stops responding to the command/message, e.g., for more than a predefined time period, it may be determined that the application is freezed (non-responding state).

In an embodiment, the monitoring unit 110 may monitor the application 130 to detect the responding or non-responding state of the application 130, continuously in real time, e.g., when the application is critical such as an application related to tracking flight information. In an embodiment, the monitoring unit 110 may monitor the application 130 at a regular or predefined time interval. In an embodiment, the user may need to activate the monitoring unit 110 to monitor the application 130, continuously or at a predefined time interval. In an embodiment, when the monitoring unit 110 is the part of the application 130, it may start monitoring the application 130 as soon as the application 130 starts executing.

When a blocking (non-responding) state of the application 130 is detected, the monitoring unit 110 sends a request to the database 120 to retrieve blocking information related to the application 130 from the database 120. In an embodiment, the request includes information of the application being monitored and for which blocking information is to be retrieved, e.g., ID of the application 130, connection ID of the application 130, name of the application 130, etc. In an embodiment, the request may include an SQL script to be executed by the database 120 to retrieve blocking information of the application 130. In an embodiment, the SQL script may be pre-stored in the database 120 (e.g., stored as a stored procedure (SP)). The SP may be created in the database 120 while installing the application 130, e.g., on the device (client's side). The SP may be linked to the application 130 and the parameters related to the application 130 (e.g., application ID, connection ID, etc.) may be stored along with the SP. An exemplarily pseudo code or SQL script stored on the database as a SP (for retrieving blocking information of the application) may be as below:

```
DECLARE @SPID int
set @SPID = 76    //SPID= connection or stored procedure ID of he application//
if EXISTS (SELECT * FROM sys.sysprocesses WHERE spid = @SPID and blocked != 0)
BEGIN
    WITH BlkPreTree(lockLevel, WaitTime, spid, blocked, program_name, hostname,
hostprocess) AS
```

```
    (
        SELECT 0 AS lockLevel, a.WaitTime, a.spid, a.blocked, a.program_name,
a.hostname, a.hostprocess
        FROM sys.sysprocesses a
        WHERE a.SPID = @SPID
        UNION ALL
        SELECT lockLevel + 1, b.WaitTime, b.spid, b.blocked, b.program_name,
b.hostname, b.hostprocess
        FROM sys.sysprocesses b INNER JOIN BlkPrcTree c ON b.spid = c.blocked
    )
    SELECT *
    FROM BlkPrcTree
    WHERE blocked = 0
END
ELSE BEGIN
    WITH BlkPrcTree(lockLevel, WaitTime, spid, blocked, program_name, hostname,
hostprocess) AS
    (
        SELECT 0 AS lockLevel, a.WaitTime, a.spid, a.blocked, a.program_name,
a.hostname, a.hostprocess
        FROM sys.sysprocesses a
        WHERE a.SPID = @SPID
        UNION ALL
        SELECT lockLevel + 1, b.WaitTime, b.spid, b.blocked, b.program_name,
b.hostname, b.hostprocess
        FROM sys.sysprocesses b INNER JOIN BlkPrcTree c ON c.spid = b.blocked
        WHERE b.program_name != ''
    )
    SELECT *
    FROM BlkPrcTree
    WHERE SPID != @SPID
END
```

The above exemplarily SQL script is stored as stored procedure (SP) in the database 120. The SP identifier (SPID) may be defined or declared as an integer in the SQL script (i.e., DECLARE @SPID int). "@" indicates "annotation" which describes metadata about a data, e.g., metadata (i.e., integer or "int") about a data "SPID." In an embodiment, if the SPID 76 exists then the script is executed further otherwise an error message may be displayed that the "SPID 76 does not exist". If the SPID 76 exists, then SELECT command is executed, i.e., "if EXISTS (SELECT*FROM sys.sysprocesses WHERE spid=@SPID and blocked !=0)", where sys.sysprocesses is a view which contains information about connection IDs or SPIDs to database server and their blocking information. The SQL script determines if the current application (monitored application), i.e., @SPID is blocked.

When the SPID is blocked (i.e., "blocked" has a non zero value or !=0) then following commands of the SQL script are executed to find a root or head blocker:

```
BEGIN
    WITH BlkPrcTree(lockLevel, WaitTime, spid, blocked,
    program_name, hostname, hostprocess) AS
    (
        SELECT 0 AS lockLevel, a.WaitTime, a.spid, a.blocked,
a.program_name, a.hostname, a.hostprocess
        FROM sys.sysprocesses a
        WHERE a.SPID = @SPID
        UNION ALL
        SELECT lockLevel + 1, b.WaitTime, b.spid, b.blocked,
b.program_name, b.hostname, b.hostprocess
        FROM sys.sysprocesses b INNER JOIN BlkPrcTree c ON
        b.spid = c.blocked
    )
    SELECT *
    FROM BlkPrcTree
    WHERE blocked = 0
END
```

Where: BlkPrcTree function retrieves blocking chain (tree structure) in a tabular format. "Blocked" may be a column name which holds connection ID of blocking connection, "locklevel" contains information on which level in the blocking tree hierarchy is the respective connection. "head-blocker" is on the top of the tree and has "locklevel"=0. The blocked applications have "locklevel">0, "waittime" is time of blocking, "blocked" contains connection ID (SPID) of blocking connection, "program_name" is a name of application which is connected to database, "hostname" is a device name of connected application to the database, "hostprocess" contains process ID (PID) of the connected application to the database. These columns uniquely identify process/application which is connected to the database and are part of the blocking tree. Using the above command blocking tree in tabular form is generated. From this generated blocking tree, the root or head blocker information may be retrieved using: (SELECT*FROM BlkPrcTree WHERE BLOCKED=0) so the application which is not blocked or blocked by zero application (i.e., BLOCKED=0) is the head or root blocker and is SELECTED/retrieved. The root or head blocker may then be the output of the executed SQL script.

When/if the "blocked" has a zero value (i.e., blocked=0), i.e., ELSE condition of the SQL script, the current or monitored application 130 (SPID) is the root or head blocker and then following commands of the SQL script are executed to find one or more victims of the current application 130:

```
ELSE BEGIN
BlkPreTree.blocked != 0
    WITH BlkPreTree(lockLevel, WaitTime, spid, blocked,
program_name, hostname, hostprocess) AS
    (
        SELECT 0 AS lockLevel, a.WaitTime, a.spid, a.blocked,
a.program_name, a.hostname, a.hostprocess
            FROM sys.sysprocesses a
            WHERE a.SPID = @SPID
            UNION ALL
            SELECT lockLevel + 1, b.WaitTime b.spid, b.blocked,
b.program_name, b.hostname, b.hostprocess
            FROM sys.sysprocesses b INNER JOIN BlkPrcTree c ON
            c.spid = b.blocked
            WHERE b.program_name != "
    )
    SELECT *
    FROM BlkPrcTree
    WHERE SPID != @SPID
END
```

Where: SELECT*FROM BlkPrcTree selects the victims of the root blocker (@SPID), i.e., all SPIDs (blocked applications) from the blocking tree are selected and retrieved except the root blocker, i.e., all SPID which are "not equal to" the @SPID (i.e., SPID of the current or monitored application or root blocker). The victims SPIDs may then be the output of the executed SQL script.

The SQL script or stored procedure (SP) may be executed by the database 120 to retrieve blocking information of the application 130 from the database 120. In an embodiment, the blocking information includes at least one of: (i) information about a root blocker (e.g., application, thread, or process which is blocking the other clients or applications); and (ii) information about blocked clients (intermediate applications which are affected by the root blocker). In an embodiment, the SQL script may provide or output one of the following messages:

(i) Single record with BlkPrcTree.blocked=0:
(ii) Single record with BlkPrcTree.blocked !=0; and
(iii) Multiple records with BlkPrcTree.blocked !=0.

When the SQL script returns a single record and BlkPrcTree.blocked=0, it indicates that the application/thread represented by this single record is the head or root blocker (BlkPrcTree.blocked=0 indicates that there is nothing above this application/thread in the chain/tree, i.e., there is 0 or no record blocking this application or thread and this application or thread is the starting point of the chain or tree). Since the application represented by the record is the root blocker, the application 130 (current application which is monitored) is a victim and is waiting for locked resources. The record includes information about the application or process on the top of a blocking chain/tree (root blocker). For example, the record may include ID and/or name of the application and/or PID, host ID, etc., of the root blocker. In an embodiment, the record or message may also include contact information of the host or client (root blocker). In an embodiment, the database 120 may retrieve contact and other information of the host or client through their connection ID.

When the SQL script returns a single record and BlkPrcTree.blocked !=0, it indicates that the single record is a victim as it is blocked by a non-zero (!=0) or some application. Since the application represented by the record is the victim, and no other application is provided as the root blocker, it indicates that the application 130 (current application/process) is a root blocker and a single application or process is waiting for locked data from the current application 130. The current application 130 is on the top (root) of the blocking tree. The message may inform the current user that his application 130 or process prevents other user or client in their work. The message may include ID and/or name of the application and/or PID, host ID, etc., which is blocked by the application 130. In an embodiment, the message may also include contact information of the host or client which is victim of the current application 130.

When the SQL script returns multiple records and BlkPrcTree.blocked !=0, it indicates that the multiple applications represented by multiple records are victim as they are blocked by non-zero (!=0) application. Since the applications represented by the records are the victims, and no other application is provided as the root blocker, it indicates that the application 130 (current application) is a blocker and multiple applications or processes are waiting for locked data from the current application. The current application 130 is on the top (root) of the blocking tree. The displayed message may inform the current user that his application or process prevents other multiple clients in their work. The message displays IDs and/or names of the applications and/or PIDs, host IDs, etc., which are blocked by the current application 130. The host ID may also be referred as ethernet address or MAC-address (Media Access Control address). In an embodiment, the record or message may also include contact information of the hosts or clients which are victim of the current application 130.

Based upon the above blocking information, the user may contact the required hosts/clients to get the blocking problem resolved. For example, the user may request the root blocker to unlock the locked resources or if the user is the root blocker then the user might try to unlock or release the locked resources. In an embodiment, when blocking information returns "null" value, it may indicate that the "non-responding" state of the application is due to other reason(s) (e.g., slow network application design issues, etc.) and not due to database blocking.

Figure 2:
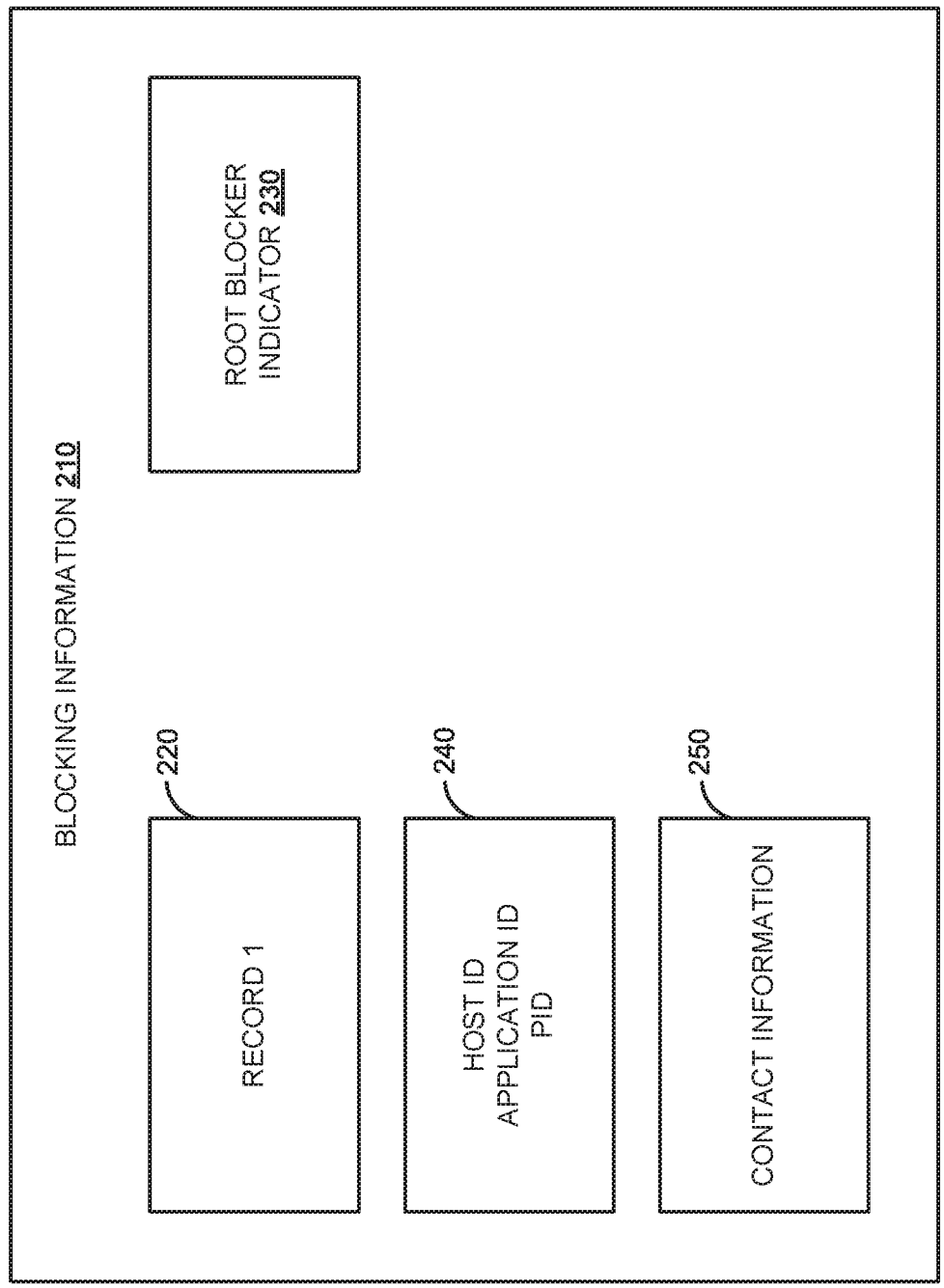
FIG. 2 illustrates an exemplarily blocking information displayed by the monitoring unit, according to an embodiment.

FIG. 2 illustrates an exemplarily blocking information 210 displayed by the monitoring unit (e.g., the monitoring unit 110 of FIG. 1). The blocking information 210 includes one or more records 220, root blocker indicator 230, IDs information 240, and contact information 250. The one or more records 220 represents one or more applications or threads, e.g., which may be victims or root blocker. The root blocker indicator 230 indicates that the current application (e.g., the application being monitored) is a root blocker or a victim. The root blocker indicator 230 may have one of the two values namely: (i) BlkPrcTree.blocked=0; and (ii) BlkPrcTree.blocked !=0. When the root blocker indicator 230 is BlkPrcTree.blocked=0, it indicates that the current application is a victim and the record (provided in the blocking information) is the root blocker. When the root blocker indicator 230 is BlkPrcTree.blocked !=0 it indicates that the current application is a root blocker and the record(s) (provided in the blocking information) are the victims. The IDs information 240 provides various IDs related to the record(s), e.g., host ID related to the record(s), application IDs related to the record(s), processes or threads IDs related to the record(s), etc. The contact information 250 provides contact information of one or more responsible persons related to each host, application, and/or process IDs. In an embodiment, the contact information 250 may be provided as hyperlink information and when user selects the hyperlink various options for calling, emailing, messaging, etc., may be displayed. In an embodiment, the contact information 250 may be provided with icons (e.g., calling icon, message icon, etc.) which may be directly selected to initiate the communication (e.g., email, call, message, etc.). In an embodiment, the root blocker indicator, IDs information, and the contact information may be a part of (included within) the record itself. It may be noted that the blocking information may be in any other format with one or more of these information.

Figure 3A:
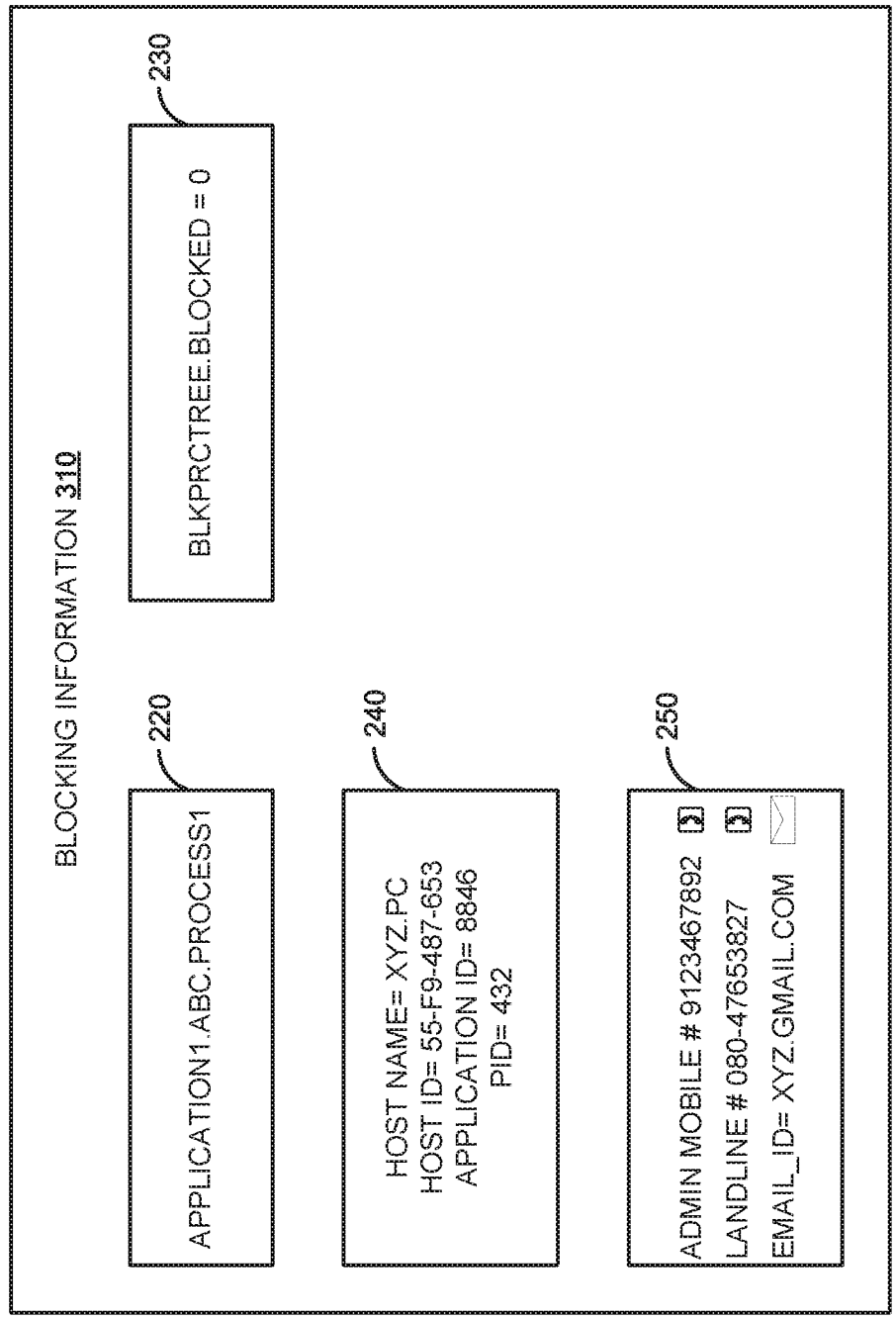
FIG. 3A illustrates an exemplarily blocking information when current application is a victim of the database blocking, according to an embodiment.

FIG. 3A illustrates an exemplarily blocking information 310 displayed when a current application (application being monitored such as the application 130 of FIG. 1) is a victim of database blocking, according to an embodiment. The blocking information 310 displays one record 220 (application1.abc.process1) and root blocker indicator 230 as "BlkPrcTree.blocked=0". The information indicates that the record representing a process or thread (application1.abc.process1) is the root blocker as it is not blocked or blocked by zero application or thread (i.e., BlkPrcTree.blocked=0). This also indicates that the current application is the victim. The IDs information 240 provides various IDs related to the record (application1.abc.process1), e.g., host name or name of device (e.g., XYZ.PC), host ID or device ID (55-F9-487-653), ID of the application (e.g., 8846), and process or thread ID (e.g., PID=432). It indicates that the process or thread (application1.abc.process1) with ID 432 of the application 1 with ID 8846 of the device XYZ.PC with ID 55-F9-487-653 is the root blocker which has blocked the current application. The contact information 250 provides contact information (mobile number, landline number, email_ID) of person who may be responsible for executing the root blocker thread/application (i.e., application1.abc.process1). In an embodiment, an option (call, email, and/or message icon) may be provided to directly initiate a call, email, and/or message to the responsible person to resolve the database blocking issue.

Figure 3B:
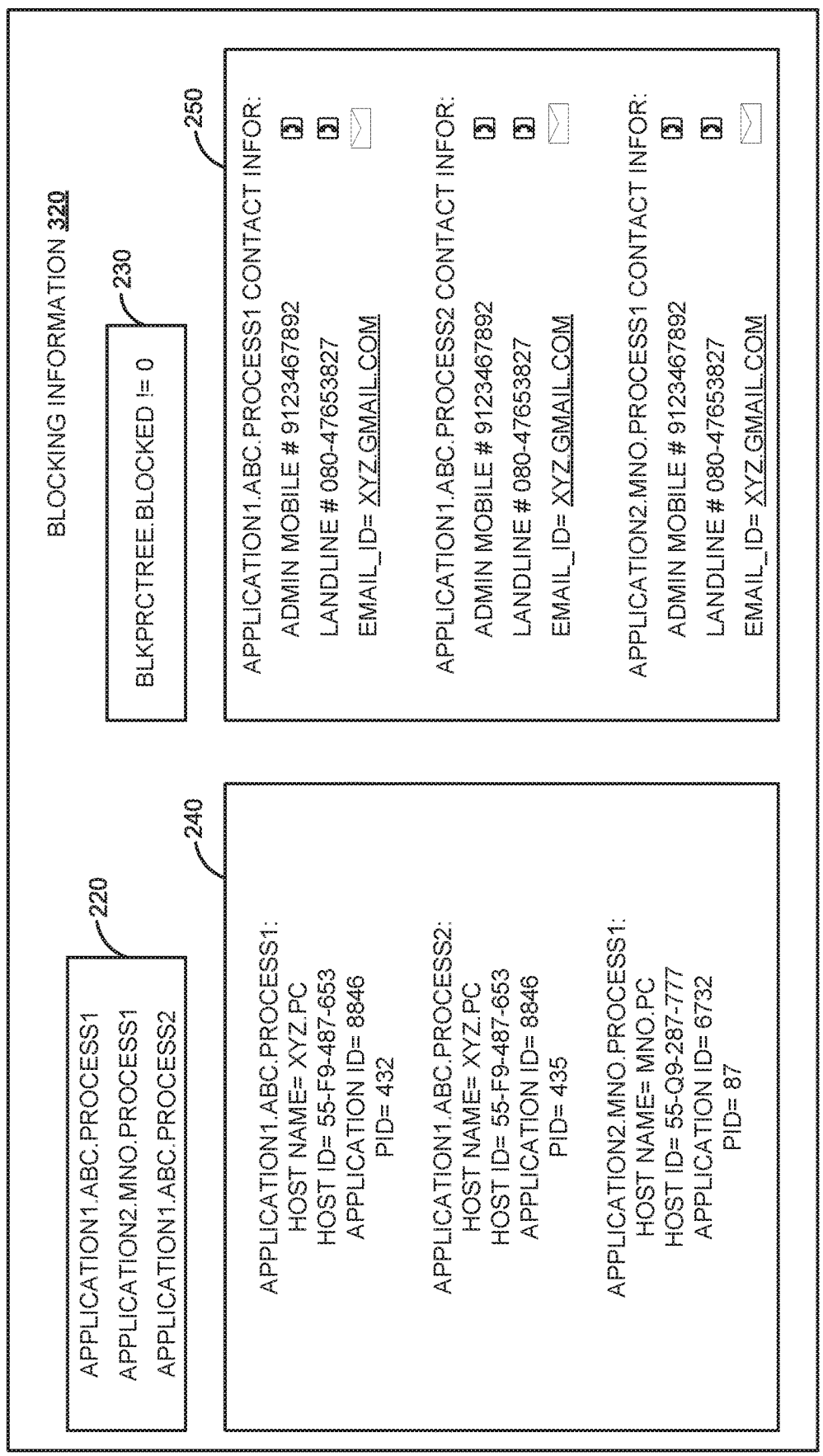
FIG. 3B illustrates an exemplarily blocking information when the current application is a root blocker of the database blocking, according to an embodiment.

FIG. 3B illustrates an exemplarily blocking information 320 displayed when a current application (application being monitored such as the application 130 of FIG. 1) is a root blocker, according to an embodiment. The blocking information 320 displays multiple records 220 (e.g., application1.abc.process1, application1.abc.process2, and application2.mno.process1) and root blocker indicator 230 as "BlkPrcTree.blocked !=0". The information 320 indicates that the threads represented by the records 220 are the victims as they are blocked by an application (BlkPrcTree.blocked !=0. i.e., blocked is not 0 means blocked by some application). The multiple records as victim also indicates that the current application is the root blocker. The IDs information 240 provides various IDs related to the application/threads which are blocked by the current application, e.g., host name or name of victim devices (e.g., XYZ.PC and MNO.PC), host ID (55-F9-487-653 and 55-q9-287-777), IDs of the victim applications (e.g., 8846 and 6732), and victim process or thread IDs (e.g., PID=432, 435, and 87), etc. It indicates that the processes (application1.abc.process1 and application1.abc.process2) with PIDs 432 and 435 of the application1 with ID 8846 of the device XYZ.PC with ID 55-F9-487-653 and the process (application2.mno.process1) with PID 87 of the application2 with ID 6732 of the device MNO.PC with ID 55-q9-287-777 are the victims (which are blocked by the current application). The contact information 250 provides contact information (mobile number, landline number, email_ID) of person who may be responsible for victim thread/application. In an embodiment, an option (calling icon, emailing icon, messaging icon, etc.) may be provided to directly make a call/email to the responsible person to resolve the database blocking issue.

Figure 4:
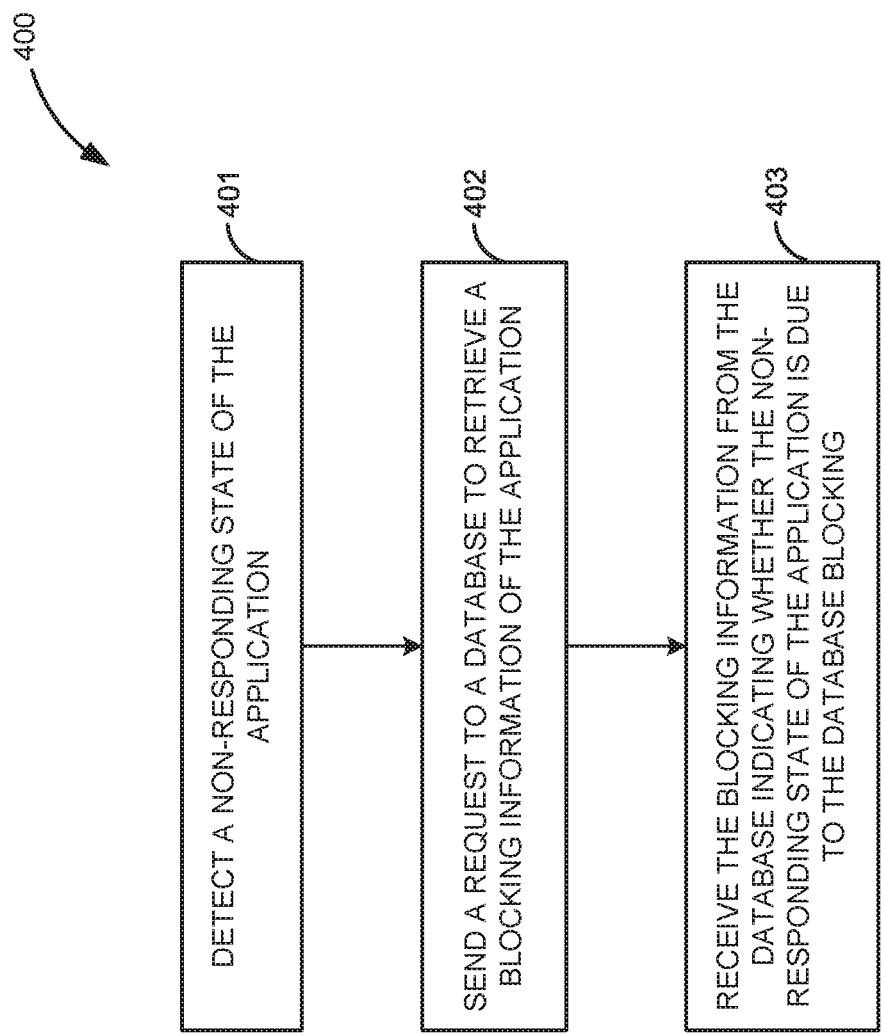
FIG. 4 is a flowchart illustrating method to determine database blocking, according to an embodiment.

FIG. 4 is a flowchart illustrating process 400 to determine database blocking, according to an embodiment. At 401, a non-responding state of an application is detected. The application is monitored by a monitoring unit (e.g., the monitoring unit 110 of FIG. 1) to detect the "non-responding" state of the application. In an embodiment, the monitoring unit may monitor the application continuously in real-time (e.g., in case of critical applications such as airplane tracking) to detect the state (responding/non-responding) of the application. In an embodiment, the monitoring unit may monitor the application at a predefined time interval. In an embodiment, the non-responding state of the application may be detected as described in below paragraph with reference to FIG. 5. At 402, once the non-responding state of the application is detected, a request is sent to a database to retrieve blocking information related to the application (monitored application). The request includes at least one of a unique connection identifier (ID) of the application and a structured query language (SQL) script for retrieving the blocking information of the application. In an embodiment, the blocking information may indicate a cause for non-responding state of the application. For example, the blocking information may indicate whether the non-responding state of the application is due to database blocking or other reasons (non-database blocking issues). At 403, the blocking information indicating whether the non-responding state of the application is due to database blocking is received. When one or more records (e.g., representing application, process, thread, etc.) is returned in the blocking information, it may be determined that the non-responding state is due to the database blocking and if "null" value (e.g., no record) is returned, then it may be determined that the non-responding state of the application is due to other reasons (not database blocking). In case the non-responding state of the application is due to other reasons (not blocking of database), it may be further investigated if its due to slow network, application design issues, etc. In case the non-responding state of the application is due to database blocking, the blocking information also indicates whether the application (monitored application) is a victim of the database blocking or the application is a root blocker (root cause of the database blocking), one or more IDs (a host name, a host ID, an application ID, and a PID) and contact information of the root blocker when the application is the victim and one or more IDs and contact information of one or more victims when the application is the root blocker.

Figure 5:
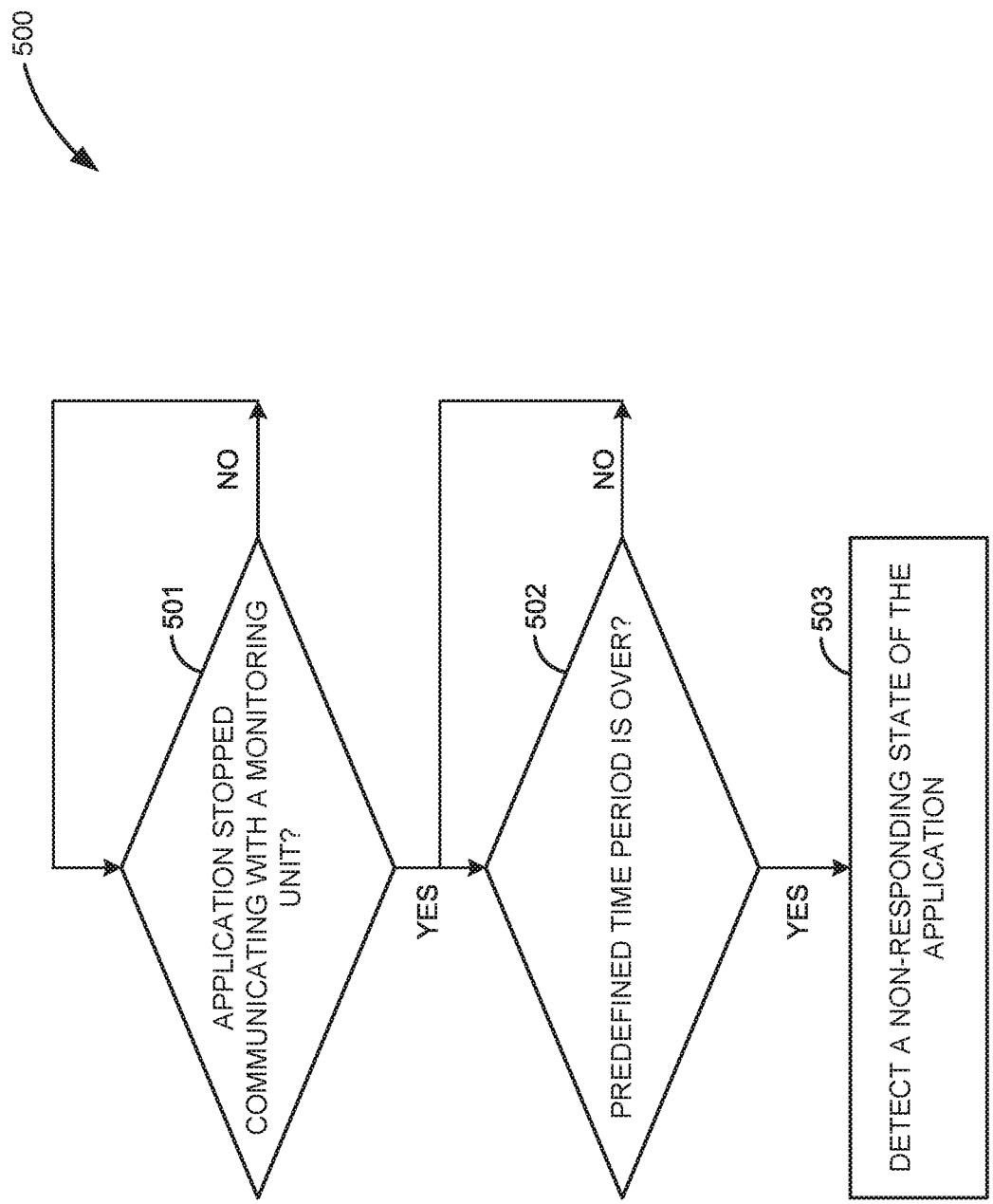
FIG. 5 is a flowchart illustrating method to detect a non-responding state of an application, according to an embodiment.

FIG. 5 is a flowchart illustrating process 500 to detect a non-responding state of an application, according to an embodiment. At 501, it is determined whether an application has stopped communicating with a monitoring unit. For example, whether the application has stopped responding to the monitoring unit and/or has stopped sending requests or command to the monitoring unit. When the application stopped communicating with the monitoring unit (501: YES), it is determined if a predefined time period is over since the last communication at 502. When the predefined time period gets over (502: YES), a non-responding state of the application is detected at 503. In an embodiment, the non-responding state of the application may be directly detected by reading at least one of a Windows® application programming interface (API) and/or a task manager of the device where the application is installed. The Windows® API and/or the task manager maintains status of the applications/processes executing on a device. For example, the task manager may display application is in "non-responding" state.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
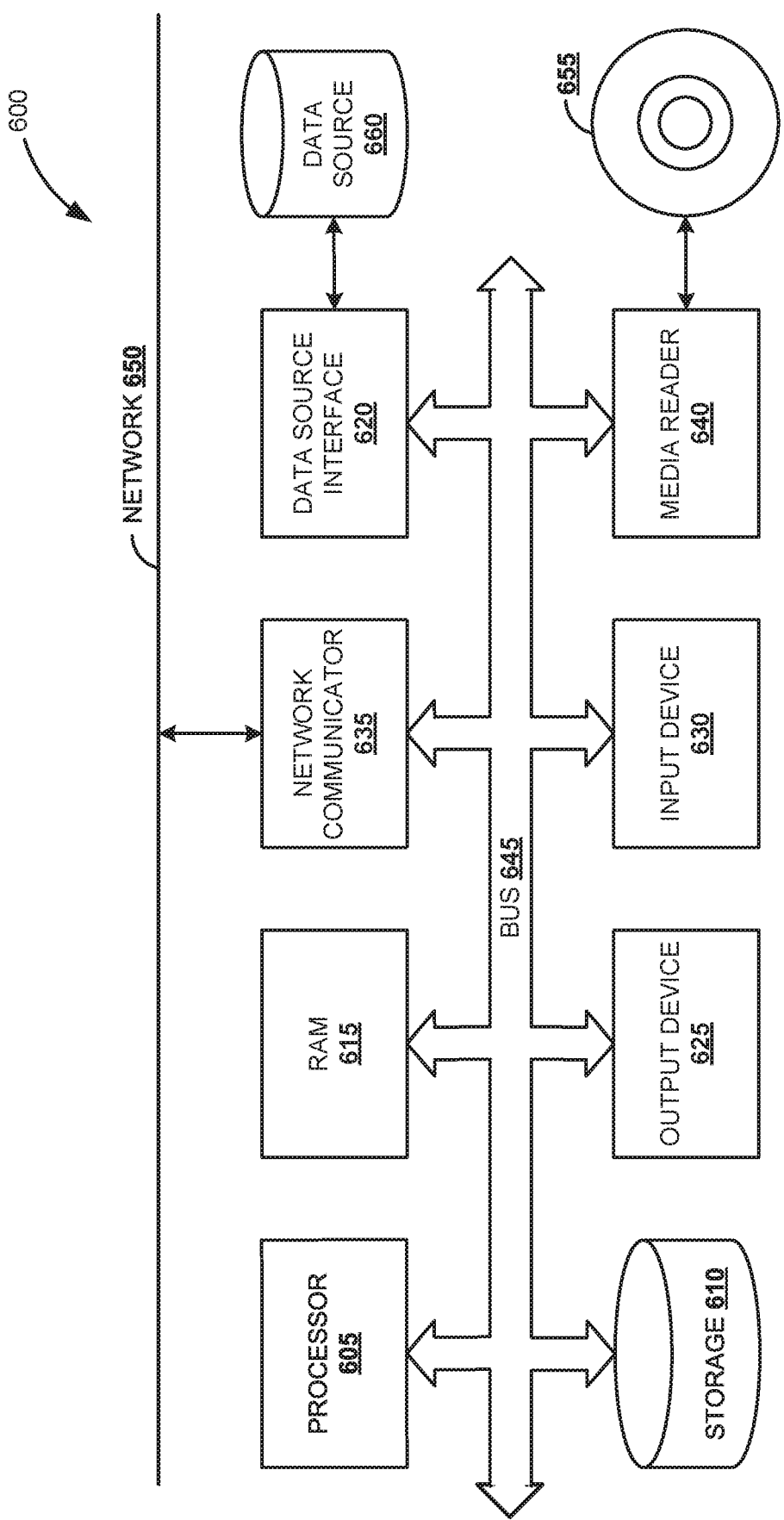
FIG. 6 is a block diagram illustrating an exemplary computer system, according to an embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. The output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments, the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium to store instructions, which when executed by a computer, causes the computer to:
   monitor a state of an application;
   upon monitoring the state of the application, detect a non-responding state of the monitored application;
   upon detecting the non-responding state of the monitored application, send a request to a database to retrieve a blocking information related to the monitored application;
   receive, from the database, the blocking information related to the monitored application;
   upon receiving the blocking information, populate a blocking information data structure with information received from the database, the blocking information related to the monitored application;
   parsing the blocking information data structure to determine one of a first and second display messages:
      in a first case that the blocking information indicates that the monitored application is a root blocker, display a first message indicating to a user of the monitored application that the monitored application is the root blocker, and
      in a second case that the blocking information indicates that the monitored application is a victim of the root blocker, display a second message indicating to the user of the monitored application that the monitored application is the victim.

2. The non-transitory computer readable medium of claim 1, wherein the non-responding state is detected upon identifying at least one of:
   the application stopped responding to a monitoring unit for over a predefined time period; and
   the application stopped sending a message to the monitoring unit for over the predefined time period.

3. The non-transitory computer readable medium of claim 1, wherein the non-responding state is detected by reading status of the application from at least one of: a Windows® application programming interface (API) and a task manager.

4. The non-transitory computer readable medium of claim 1, wherein the request comprises at least one of:
   a unique connection identifier (ID) of the application, wherein the unique connection ID indicates a unique connection of the application with the database; and
   a structured query language (SQL) script to retrieve the blocking information from the database.

5. The non-transitory computer readable medium of claim 1, wherein the request includes a reference to a stored procedure corresponding to the application, wherein the stored procedure is a structured query language (SQL) script stored in the database to retrieve the blocking information related to the application.

6. A computer-implemented method comprising:
   monitoring a state of an application;
   upon monitoring the state of the application, detecting a non-responding state of the monitored application;
   upon detecting the non-responding state of the monitored application, sending a request to a database to retrieve a blocking information related to the monitored application;
   receiving, from the database, the blocking information related to the monitored application;
   upon receiving the blocking information, populating a blocking information data structure with information received from the database, the blocking information related to the monitored application;
   parsing the blocking information data structure to determine one of a first and second display messages:
      in a first case that the blocking information indicates that the monitored application is a root blocker, displaying a first message indicating to a user of the monitored application that the monitored application is the root blocker, and
      in a second case that the blocking information indicates that the monitored application is a victim of the root blocker, displaying a second message indicating to the user of the monitored application that the monitored application is the victim.

7. The method of claim 6, wherein the non-responding state of the application is detected by performing at least one of:
   identifying that the application stopped responding to a monitoring unit for over a predefined time period;
   identifying that the application stopped sending a message to the monitoring unit for over the predefined time period; and
   reading at least one of: a Windows® application programming interface (API) and a task manager.

8. A computer system comprising:
   at least one memory to store executable instructions; and
   at least one processor communicatively coupled to the at least one memory, the at least one processor configured to execute the executable instructions to:
      monitor a state of an application;
      upon monitoring the state of the application, detect a non-responding state of the monitored application;
      upon detecting the non-responding state of the monitored application, send a request to a database to retrieve a blocking information related to the monitored application;
      receive, from the database, the blocking information related to the monitored application;
      upon receiving the blocking information, populate a blocking information data structure with information received from the database, the blocking information related to the monitored application;
      parsing the blocking information data structure to determine one of a first and second display messages:
         in a first case that the blocking information indicates that the monitored application is a root blocker, display a first message indicating to a user of the monitored application that the monitored application is the root blocker, and
         in a second case that the blocking information indicates that the monitored application is a victim of the root blocker, display a second message indicating to the user of the monitored application that the monitored application is the victim.

9. The system of claim 8, wherein the at least one processor is further configured to execute the executable instructions to detect the non-responding state by identifying at least one of:

the application stopped responding to a monitoring unit for over a predefined time period;

and the application stopped sending a message to the monitoring unit for over the predefined time period.

10. The system of claim 8, wherein the at least one processor is further configured to execute the executable instructions to detect the non-responding state by reading at least one of: a Windows® application programming interface (API) and a task manager.

11. The system of claim 8, wherein the request comprises at least one of:

a unique connection identifier (ID) of the application, wherein the unique connection ID indicates a unique connection of the application with the database; and a structured query language (SQL) script to retrieve the blocking information from the database.

12. The system of claim 8, wherein the non-responding state of the application refers to a state when there is no communication between the application and the database.

13. The system of claim 8, wherein the request includes a reference to a stored procedure corresponding to the application, wherein the stored procedure is a structured query language (SQL) script stored in the database to retrieve the blocking information related to the application.

* * * * *